May 13, 1958 C. E. SENTMAN 2,834,574
WINCH ASSEMBLY
Filed Jan. 24, 1955
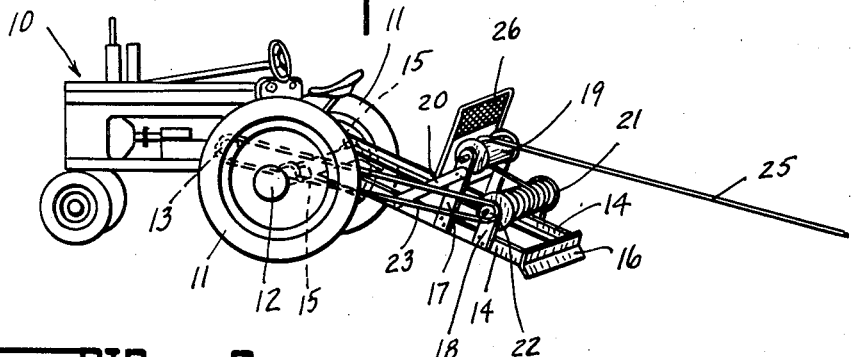
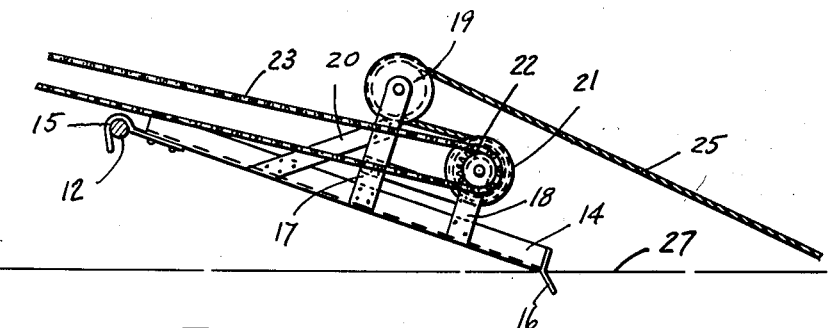
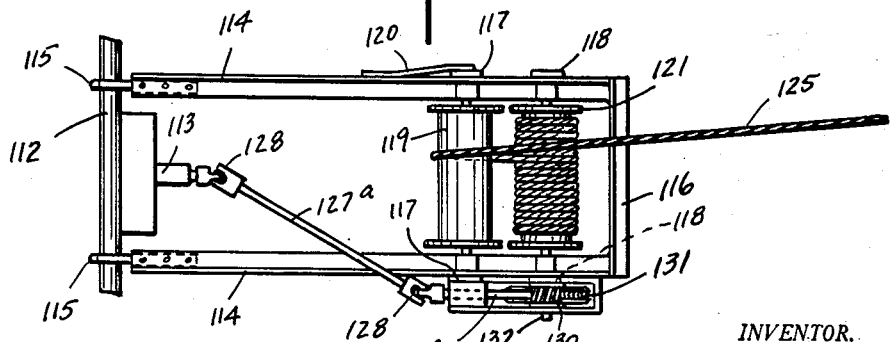
INVENTOR.
CHARLES E. SENTMAN.
BY
Lockwood, Galt, Woodard & Smith
ATTORNEYS.

United States Patent Office 2,834,574
Patented May 13, 1958

2,834,574

WINCH ASSEMBLY

Charles E. Sentman, Waveland, Ind.

Application January 24, 1955, Serial No. 483,785

1 Claim. (Cl. 254—166)

This invention relates to a winch assembly, and more particularly to one for use in pulling brush, small trees, logs or the like.

As is well known, it frequently becomes necessary, particularly in connection with farm work to pull or uproot brush, small trees, logs and the like. Yet because of limitations of the wheel power of the average farm tractor incident to wheel slippage, the object to be pulled does not "give" either because it is too heavy or too deeply rooted. Consequently if a farm tractor is to be used under such circumstances it obviously will be necessary that an apparatus be used with it in order to effectively accomplish the desired ends. It is the primary object, therefore, of this invention to provide an apparatus of such character and construction that it may readily be attached to the rear axle of a tractor, cultivator, plower or the like thereby substantially increasing the pulling power of the implement.

It is a still further object of the present invention to provide apparatus for use with conventional farm implements such as tractors so that brush, logs and the like of substantial weight may be readily pulled without strain upon their gears. This is accomplished by placing the tractor in neutral and using the conventional power take-off.

It is a further object of the present invention to provide a protective screen behind the tractor seat so that the operator may be protected in the event of cable breakage.

It is a still further object of the present invention to provide an assembly of the foregoing character which is readily and easily attached to the rear axle of a conventional farm implement, and which may be sold as an accessory or attachment to farmers already having their tractors and the like.

The full nature of the invention will be understood from the accompanying drawings and the following description and claim.

In the drawings:

Fig. 1 is a perspective view of a tractor showing the invention attached to the rear axle thereof.

Fig. 2 is a side elevation view of the attachment itself, the tractor and protective shield being removed.

Fig. 3 is a modified form of the invention shown in top plan.

In the drawings the tractor 10 is of conventional type and includes the wheels 11 connected to the rear axle 12. The belt pulley is shown at 13. As is well known, if the farmer is endeavoring to pull brush, small trees or the like with his tractor he will usually connect a chain to the rear axle. In the event the weight of the object being pulled is too heavy relative to the weight of the tractor and/or the condition of the ground, there will be wheel slippage. This not only means that the pulling power of the tractor is rendered ineffective but as well means that the ground will generally be cut up by the spinning of the wheels, particularly if it is somewhat moist or damp.

In order to overcome this obvious disadvantage which is connected with the conventional way of pulling brush, small trees or the like, the present invention is provided. It consists of a pair of elongated members 14 such as angle irons or the like which are substantially parallel. At the forward end of each member there is formed a hook 15 which is of such configuration and size that it may readily embrace and be hooked upon the rear axle of the tractor.

At the opposite ends of the two members and connecting them is the anchoring bar or shoe 16 which is for the purpose of preventing rearward movement of the tractor and the invention during the act of pulling when the strain thereupon is great. Secured to each member or angle iron is an upright or post 17 and an upright or post 18. The two opposite posts 17 are in alignment and have mounted adjacent their upper extremities the idler drum 19. The struts or braces 20 are provided to give the drum greater rigidity and support.

The opposed posts 18 mount adjacent their upper extremity the driven drum 21. Associated with this drum is the sprocket wheel 22 about which is trained the detachable link chain 23 or the like.

In order to provide a protective screen behind the operator so that in the event of breakage of the cable 25 he will not be harmed, there is provided the shield 26.

In the modified form of the invention shown in Fig. 3 which actually is the most practical form, the rear axle of the tractor or other farm implement is shown at 112. The conventional power take-off 113 drives driven drum 121 through the medium of the shaft 127a connected by universal joints 128 to the power take-off on one hand and to the worm shaft 129 on the other. The latter shaft mounts a worm 130 which is in mesh with the worm gear 131 carried by the driven drum shaft 132.

The elongated members forming the frame by which the drums are supported are shown at 114. Hooks 115 are secured to one end thereof for engagement with the rear axle of the tractor or other farm implement. The opposite ends of the members 114 are connected by the anchoring bar or shoe 116 which prevents rearward movement of the invention during the act of pulling when the strain thereupon is, of course, at its greatest. Secured to each member is an upright or post 117 and an upright or post 118. The two opposite posts 117 are in alignment and support adjacent their upper extremities the idler drum 119. Struts or braces 120 are provided to give the uprights and by the same token the drum greater support.

The opposed uprights or posts 118 mount adjacent their upper extremities the aforementioned driven drum 121. About this drum is trained the cable 125 which is connected at its other end to the logs or brush being pulled. As shown in Fig. 3, the cable extends forwardly from driven drum 121 up and over and then rearwardly of idler drum 119.

In use the operator will put the tractor motor in neutral after he has hooked up the opposite end of cable with the object to be pulled. The power take-off or belt pulley will drive drum 21 (or 121 as the case may be). One end of the cable will be connected to this drum. As it is thereby rotated the cable, which is trained about drum 19 (or 119 as the case may be), will be pulled towards the tractor, pulling the object with it. By reason of the fact that the location of the idler drum is above and forwardly of the driven drum a backward and downward pressure will be exerted as the logs, trees, brush or the like are being pulled by the cable. This causes the shoe or anchoring bar to become embedded in the ground 27 thereby effectively preventing rearward movement of the tractor or the invention. The amount of power possible to generate through the use of the invention varies with the weight of the vehicle to which it is attached and the distance between the power take-off and the idler drum axis.

By replacing the driven drum with an idler drum of the general character of drum 19 or 119, the invention may be installed on a machine or farm implement that carries its own winch.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A winch assembly for use with farm implements having a rear axle and a power take-off, said assembly comprising a downwardly inclined frame having hooks at one end for readily separable connection to said rear axle, the other end of said frame including a ground engaging shoe, a drum rotatably carried by said frame and including means for connection to said power take-off whereby said drum may be rotated, a pair of aligned posts secured to said frame and extending upwardly from opposite sides thereof, a second drum rotatably journalled in the upper ends of said posts in a plane forwardly of and above said first drum, and a cable connected to said first drum and extending first under and then around a portion of said second drum to the rear of said assembly for attachment to objects to be pulled, whereby backward and downward pressure will be exerted upon said frame as objects are being pulled.

References Cited in the file of this patent

UNITED STATES PATENTS

| | | |
|---|---|---|
| 1,529,912 | Peacock | Mar. 17, 1925 |
| 1,630,800 | Page | May 31, 1927 |
| 2,361,931 | Evans | Nov. 7, 1944 |
| 2,591,770 | Benner | Apr. 8, 1952 |

FOREIGN PATENTS

| | | |
|---|---|---|
| 151,957 | Australia | June 18, 1953 |
| 812,710 | Germany | Sept. 3, 1951 |